(12) United States Patent
Rueger

(10) Patent No.: US 7,254,998 B2
(45) Date of Patent: Aug. 14, 2007

(54) METHOD FOR DETERMINING DRAG CHARACTERISTICS OF AIRCRAFT AND SYSTEM FOR PERFORMING THE METHOD

(75) Inventor: Mathew L. Rueger, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 11/262,678

(22) Filed: Oct. 31, 2005

(65) Prior Publication Data

US 2007/0095135 A1    May 3, 2007

(51) Int. Cl.
*G01M 9/00* (2006.01)
(52) U.S. Cl. ...................................................... 73/147
(58) Field of Classification Search .................. 73/147
See application file for complete search history.

(56) References Cited

U.S. PATENT DOCUMENTS

| 4,862,739 | A | * | 9/1989 | Dobbs ......................... 73/147 |
| 4,920,791 | A | * | 5/1990 | Griffin ......................... 73/147 |
| 5,020,364 | A | * | 6/1991 | Manitt et al. ................. 73/147 |
| 5,345,818 | A | * | 9/1994 | Magill et al. ................. 73/147 |
| 6,571,618 | B2 | * | 6/2003 | Demay et al. ................ 73/147 |

FOREIGN PATENT DOCUMENTS

| JP | 63235844 A | * | 9/1988 |
| JP | 01299434 A | * | 12/1989 |
| JP | 05187961 A | * | 7/1993 |

OTHER PUBLICATIONS

Crites, R. C., "Development of a Simple Optical Pitch Sensor," AIAA 86-0770, 1986.
Crawford, B. L. et al., "Improved Correction System for Vibration Sensitive Inertial Angle of Attack Measurement Devices," AIAA 2000-0415, 2000.
Fuykschot, P. H., "Vibration Compensation of Gravity Sensing Inclinometers in Windtunnel Models," NLR Technical Publication TP 96003 L, 2003.
Lawrence, A., *Modern Inertial Technology*, Ch. 9 "The Dynamically Tuned Gyroscope," 2nd ed., Springer-Verlag, New York, 1992.

(Continued)

*Primary Examiner*—Edward Lefkowitz
*Assistant Examiner*—Jermaine Jenkins
(74) *Attorney, Agent, or Firm*—Lee & Hayes, PLLC

(57) ABSTRACT

A method for designing aircraft including providing a model of the aircraft and a plurality of sensors mounted on the model. The method further includes positioning the aircraft model in a fluid tunnel at an initial attitude and measuring an initial orientation of the aircraft model while the aircraft model is at the initial attitude using a first tilt sensor of the sensors to create initial orientation information. The method also includes passing fluid over the aircraft model using the fluid tunnel and actively moving the aircraft model from the initial attitude to a subsequent attitude. In addition, the method includes measuring a subsequent orientation of the aircraft model while the aircraft model is at the subsequent attitude using a first orientation sensor of the sensors to create subsequent orientation information.

20 Claims, 4 Drawing Sheets

OTHER PUBLICATIONS

Liu, T, et al., "Photogrammetry Applied to Wind-Tunnel Testing," *AIAA Journal*, vol. 38, No. 6, 2000, pp. 964-971.

Rueger, M.L. et al., "Transonic Wind Tunnel Boundary Interference Correction," *AGARD Conference Proceedings 535, Wall Interference, Support Interference, and Flow Field Measurements*, AGARD-CP-535, Advisory Group for Aerospace Research and Development, 1994.

Ruyten, W., "Model Attitude Measurement with an Eight-Camera Pressure-Sensitive Paint System," AIAA 2000-0831, 2000.

Tcheng, P., et al., "Effects of Yaw and Pitch Motion on Model Attitude Measurements," NASA TM-4641, 1995.

\* cited by examiner

METHOD FOR DETERMINING DRAG CHARACTERISTICS OF AIRCRAFT AND SYSTEM FOR PERFORMING THE METHOD

BACKGROUND OF THE INVENTION

The present invention relates to a process for determining drag characteristics of an aircraft and, more particularly, to a process for determining drag characteristics of an aircraft including moving a model of the aircraft between various attitudes.

Drag is a mechanical force that opposes motion of an object through a fluid, such as an aerodynamic force opposing motion of an aircraft moving through air. Drag D on an object can generally be represented by an equation (1):

$$D = F_A \cos \alpha + F_N \sin \alpha \tag{1}$$

where:
$F_A$=aft force;
$F_N$=normal force; and
$\alpha$=a pitch angle or angle of attack of the object, as shown in FIG. 1. The aft force $F_A$ and normal force $F_N$ are referred to as drag variables because they are the force values used to determine drag. The aft force $F_A$ experienced by the object 10 is measured along a fore/aft axis $A_A$ extending between a forward end 12 and an aft end 14 of the object. The normal force $F_N$ is measured along a normal axis $A_N$ extending between a bottom 16 and a top 18 of the object 10 and is perpendicular to the fore/aft axis. The normal and axial forces $F_N$, $F_A$ are referenced to and move with the object 10. The angle of attack $\alpha$ is the angle between the fore/aft axis $A_A$ and horizontal H. Drag D and lift L are generally fixed coordinates coinciding with horizontal H and vertical V, respectively. Because determining drag D using equation (1) requires knowledge of the angle of attack $\alpha$, a reliable way of determining that angle is needed.

Conventionally, orientation of objects, such as aircraft models in wind tunnels, has generally been measured using a mechanical linkage (not shown) including a potentiometer or encoder. However this method of measuring orientation suffers from fundamental errors associated with mechanical hysteresis and/or slop. Mechanical hysteresis is a retardation effect of load on structural displacement. Thus, displacement of a structure under a current load is a function of the current load and previously applied loads. Hysteresis may result from, for example, slipping between adjacent parts in the mechanical linkage under deformation or anelastic behavior in linkage materials. Slop is a discontinuous change in structural displacement under load that results between non-rigidly connected linkage parts. Because of the errors of mechanical linkage systems, systems (not shown) including an on-board measuring device, such as an electrolytic tilt sensor or a servo-accelerometer, have been used. An electrolytic tilt sensor includes a body containing an electrolytic fluid and an amount of electric current conducted through the sensor changes as the sensor body is tilted. A servo-accelerometer, or "servo", has a primary axis and measures an amount of acceleration along that axis. If the sensor is at rest, an amount of acceleration due to gravity acting along that axis indicates the sensor attitude. Output "s" of a servo can be represented by an equation (2):

$$s = g \cdot \sin \alpha \tag{2}$$

where:
g=acceleration due to gravity; and
$\alpha$=the pitch angle of the sensor.

For example, when servo output "s" is zero, the primary axis of the servo is horizontal and the pitch angle $\alpha$ is zero. As another example, when the servo provides an output "s" of gravity "g", the servo primary axis is vertical and the angle $\alpha$ is 90°. As yet another example, when the servo provides a readout corresponding to a measurement of ½ g, the servo primary axis at an angle of 30° from horizontal H.

Electrolytic and servo sensors have various shortcomings rendering them unable to accurately measure object 32 orientation as the object attitude changes. Although electrolytic tilt sensors can be accurate for measuring tilt values close to 0°, they tend to be less accurate when measuring tilt angles further away from 0°. For example, some electrolytic tilt sensors have an accuracy that is generally inversely proportional to the angle being measured so that sensor accuracy decreases as the actual angle of the object is increased. Further, electrolytic tilt sensors are temperature sensitive and produce various outputs for the same non-zero tilt angle under various temperatures. Another shortcoming of electrolytic tilt sensors is their inaccuracy under dynamic conditions. That is, when an electrolytic tilt sensor is moved rapidly from one attitude to another and/or the sensor is vibrated, such as often occurs when high velocity fluid passes over the object 32, the electrolytic fluid profile in the sensor body is temporarily disrupted so the sensor readout is not an accurate indication of the actual sensor angle. The temporary disruption of accuracy continues until the electrolytic sensor fluid has had time to settle. Thus, electrolytic tilt sensors cannot be relied upon for accurately measuring angles when the object is rapidly moving, and/or when the object vibrates, even when the object is positioned at an angle of attack $\alpha$ near 0°.

Servo-accelerometers are inaccurate under dynamic conditions because they, being designed to measure acceleration, cannot distinguish whether a change sensed in acceleration is due solely to a tilt of its primary axis or also due to some acceleration during object movement. Thus, servos also cannot be relied upon when the object is moving and/or vibrating. A system and process for using the system is needed to accurately determine object orientation when the object is being accelerated.

BRIEF SUMMARY OF THE INVENTION

The present invention relates to a method for designing an aircraft including providing a model of the aircraft and a plurality of sensors mounted on the aircraft model. The method further includes positioning the aircraft model in a fluid tunnel at an initial attitude and measuring an initial orientation of the aircraft model while the aircraft model is at the initial attitude using a first tilt sensor of the sensors to create initial orientation information. The method also includes passing fluid over the aircraft model using the fluid tunnel and actively moving the aircraft model from the initial attitude to a subsequent attitude. In addition, the method includes measuring a subsequent orientation of the aircraft model while the aircraft model is at the subsequent attitude using a first orientation sensor of the sensors to create subsequent orientation information.

In another aspect, the present invention relates to a process for determining drag characteristics of an object in a fluid tunnel including providing a system having at least three sensors mounted on the object and a processor operatively connected to each sensor. The process further includes positioning the object at an initial attitude in the fluid tunnel and measuring an initial orientation of the object while the object is at the initial attitude using a first tilt sensor of the sensors to create initial orientation information. The process also includes passing fluid over the object using the fluid tunnel and moving the object from the initial attitude to a subsequent attitude. In addition, the process includes measuring a subsequent orientation of the object while the object is at the subsequent attitude using a first orientation sensor of the sensors to create subsequent orientation information of the object and measuring subsequent drag variables of the object while the object is at the subsequent attitude and the fluid is passing over the object using a drag sensor to create subsequent drag information. Further, the process includes processing the initial and subsequent orientation information using the processor to create resulting orientation information of the object and processing the resulting orientation information and the subsequent drag information using the processor to determine a resulting drag of the object.

In yet another aspect, the present invention relates to a process for determining a resulting orientation of an object including providing a system having a plurality of sensors mounted on the object and a processor operatively connected to each sensor. The process further includes positioning the object at an initial attitude and measuring an initial orientation of the object while the object is at the initial attitude using a first tilt sensor of the sensors to create initial orientation information. The process also includes moving the object from the initial attitude to a subsequent attitude and measuring a subsequent orientation of the object while the object is at the subsequent attitude using a first orientation sensor of the sensors to create subsequent orientation information. In addition, the process includes processing the initial orientation information and the subsequent orientation information using the processor to determine the resulting orientation of the object.

In still another aspect, the present invention relates to a system for determining a resulting orientation of an object including a first tilt sensor for mounting on the object for measuring an initial orientation of the object to create initial orientation information of the object during operation of the system. The system further includes a first orientation sensor for mounting on the object for measuring a subsequent orientation of the object to create subsequent orientation information of the object during operation of the system. The system also includes a processor operatively connected to each sensor for determining a resulting orientation of the object by processing the initial orientation information and the subsequent orientation information during operation of the system.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
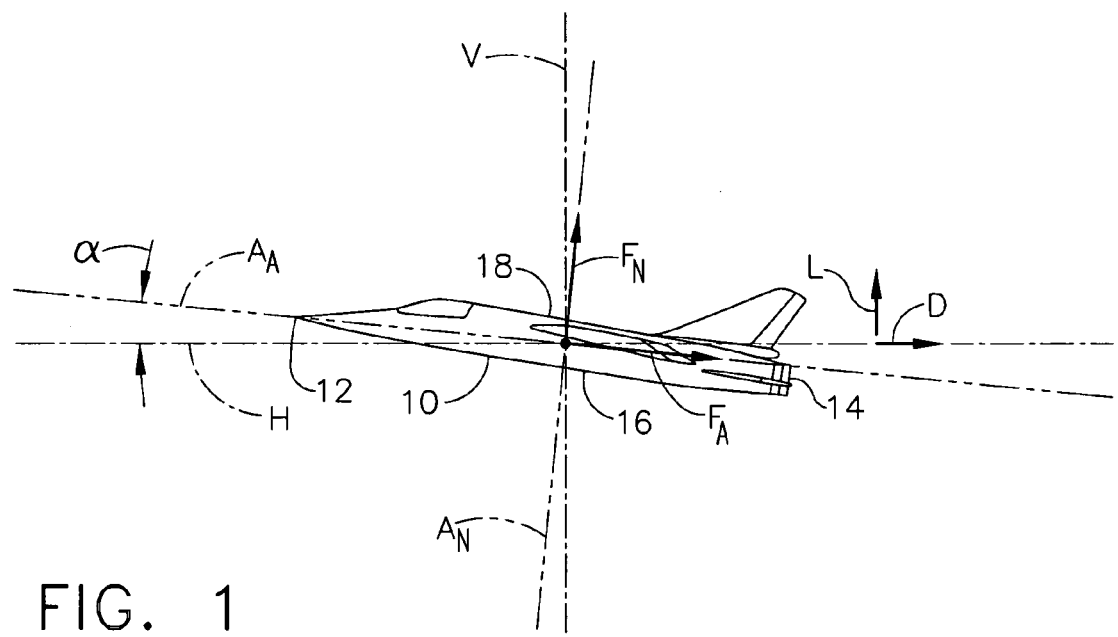
FIG. 1 is a side view of an object in a wind tunnel.
Figure 2:
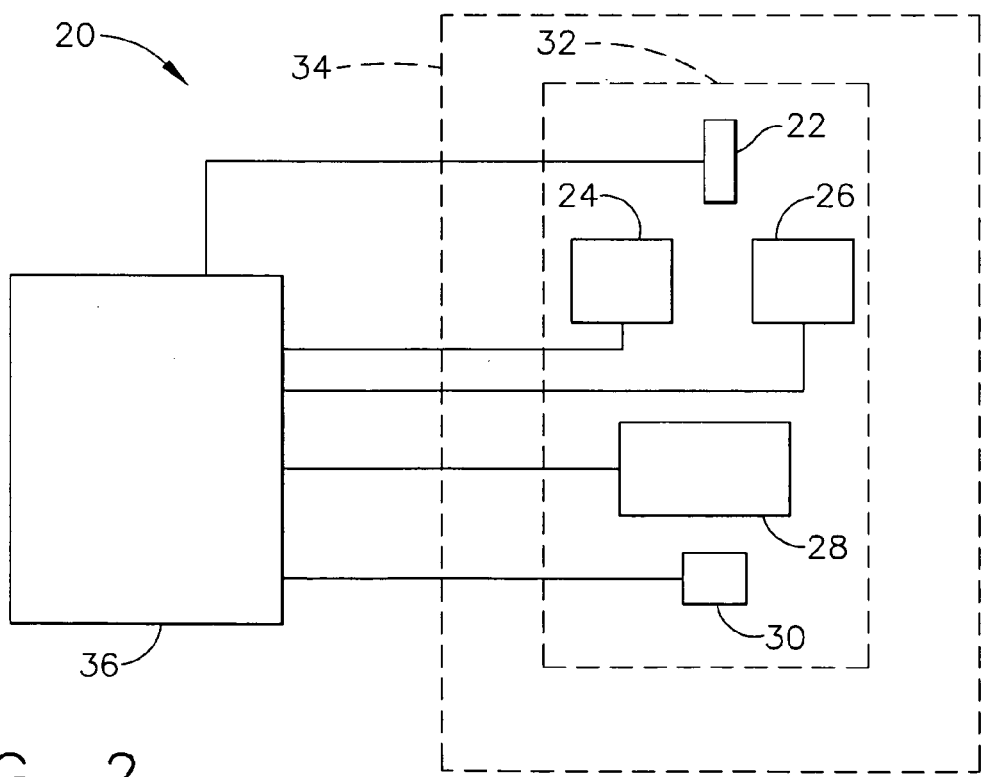
FIG. 2 is a schematic of a system according to a first embodiment of the present invention.

Referring to the figures, and more particularly to FIG. 2, a system according to a first embodiment of the present invention is designated in its entirety by reference number 20. The system includes a plurality of sensors 22, 24, 26, 28, 30 mounted on an object 32, such as a model vehicle used for testing dynamic effects of vehicle contours in a simulation apparatus such as a fluid tunnel. For example, in one embodiment, the object 32 is a model aircraft, such as that shown in FIG. 1, used in a wind tunnel 34 for testing aerodynamics. In another embodiment (not shown), the object 32 is a submarine used in a water tunnel for testing aquidynamics. The system 20 may also be used on actual vehicles, such as aircraft or submarines, during their operation without departing from the scope of the present invention. The system 20 further includes a processor 36 operatively connected to each sensor 22, 24, 26, 28, 30. Although other types of processors 36 may be used without departing from the scope of the present invention, in one embodiment the processor 36 is a conventional personal computer. The system 20 is used to determine an orientation of the object 32 at various object attitudes and, using the orientation information, to determine drag characteristics of the object at the respective attitudes.

During operation of the system 20, a first tilt sensor 22 of the sensors 22, 24, 26, 28, 30 is used to measure an initial orientation of the object 32 when the object is at an initial attitude to create initial orientation information of the object. The initial attitude may include an initial angle of attack a (shown in FIG. 1) and initial roll and yaw angles (not shown in detail). Although the first tilt sensor 22 may be other sensor types without departing from the scope of the present invention, in one embodiment the first tilt sensor is a two-axis tilt sensor, such as a two-axis electrolytic tilt sensor. A two-axis sensor can measure tilt about two orthogonal axes, such as measuring pitch and roll. In one embodiment, a tilt sensor 22 such as an electrolytic tilt sensor is preferred over a tilt sensor such as a servo-accelerometer because the electrolytic tilt sensor is smaller and more accurate at angles close to 0°. Although other types of electrolytic tilt sensors 22 can be used without departing from the scope of the present invention, in one embodiment the electrolytic tilt sensor is a L-212T sensor, available from Spectron Glass and Electronics, Inc., of Hauppauge, N.Y. As described in the Background of the Invention section above, tilt sensors 22 such as electrolytic tilt sensors are effective for measuring orientation of an object when the object is static and has no or only slight tilt from horizontal. Thus, tilt sensors such as electrolytic tilt sensors are useful for measuring an initial orientation including an angle of attack a of about 0°. Temperature sensitivity of the electrolytic tilt sensor 22 is not an issue when the electrolytic tilt sensor is used at the start of each test cycle. The initial attitude of the object 32 also includes an initial roll angle (not shown) and a single two-axis first tilt sensor 22 or two single-axis tilt sensors can measure the initial roll angle to create the initial orientation information of the object.

Further, during operation of the system 20, one or both of a first orientation sensor 24 and a second orientation sensor 26 of the plurality of sensors 22, 24, 26, 28, 30 are used to measure object 32 orientation subsequent to the object being moved from its initial attitude and while fluid, such as air, is passing over the object. In one embodiment, the first and second orientation sensors 24, 26 measure object orientation repeatedly as the object 32 is moved continuously from the initial attitude to the subsequent attitude. Tilt sensors such as electrolytic tilt sensors and servo-accelerometers are not effective for measuring orientation of a rapidly moving and/or vibrating object for the reasons described in the Background of the Invention section, above. In one embodiment, the first and second orientation sensors 24, 26 are two-axis dynamically-tuned gyroscopic sensors or gyros. Although other types of dynamically tuned gyros 24, 26 may be used without departing from the scope of the present invention, in one embodiment each dynamically tuned gyros is a G2000 sensor, available from Northrop Grumman Corp., of Los Angeles, Calif. In another embodiment (not shown in detail), the first and second orientation sensors 24, 26 are single-axis fiber-optic gyroscopic sensors or gyros. The first and second orientation sensors 24, 26 may be any type of sensor that is not very sensitive to rapid changes in object orientation or object vibration.

Although dynamically-tuned gyros are somewhat sensitive to vibration, they are generally less sensitive than electrolytic tilt and servo-accelerometer sensors and are suitable for accurately measuring orientation changes of moving and/or vibrating objects. To measure object 32 orientation changes with respect to two axes (e.g., pitch and roll), either a single two-axis sensor or two single-axis sensors can be used. When two two-axis sensors are used to measure object 32 orientation with respect to three orthogonal directions, one of the axis measurements will be redundantly measured. For example, the pitch angle is redundantly measured when the first orientation sensor 24 is positioned to measure pitch and roll and the second orientation sensor 26 is positioned to measure yaw and pitch. To measure object 32 orientation changes with respect to three axes (e.g., pitch, roll, and yaw), either two two-axis sensors, one two-axis sensor and one single-axis sensor, or three single-axis sensors can be used. Thus, although first and second orientation sensors 24, 26 are shown in FIG. 2, a single sensor or three or more sensors may serve their purpose in the system 20.

Gyros measure a rate of orientation change and not orientation as tilt sensors do. Thus, gyro readings must be summed or integrated to identify a particular orientation. It is the integration of a change in the rate of attitude change that allows gyros to provide relatively clean outputs despite unwanted vibration noise. That is, because the gyro measures a rate of orientation change and sums all of the changes, positive and negative, small deviations caused by the vibrations generally cancel each other out to render a generally smooth readout of orientation change. In one embodiment, the processor 36 performs the integrations. Because gyros measure a rate of change in angular orientation, they are relatively insensitive to linear vibrations compared to sensors that measure linear acceleration, such as servo-accelerometers. The pitch angle or angle of attack α of a gyro sensor can be represented by an equation (3):

$$\alpha = \kappa \int_0^t (v - v_0) dt + \rho \tag{3}$$

where:
κ=a conversion constant;
ρ=initial pitch angle;
v=voltage output of the sensor with respect to change in pitch; and
$v_0$=voltage bias (voltage at initial attitude) with respect to pitch.

Similarly, a roll angle θ of the sensor may be represented by an equation (4):

$$\theta = \chi \int_0^t (e - e_0) dt + \beta \tag{4}$$

where:
X=a conversion constant;
β=initial roll of the object;
e=voltage output of the sensor with respect to change in roll; and
$e_0$=voltage bias (voltage at initial attitude) with respect to roll.

As will be appreciated by those skilled in the art, a yaw angle may be represented by an equation (not shown) similar to equations (4) and (5). When the object 32 is symmetric in the lateral direction (i.e., the left side of the object is a mirror image of the right side) and the object is laterally centered in a laterally symmetric simulation device, yaw angle will generally not change. For this reason, the pitch and roll components of object 32 orientation are primarily be discussed. A user may chose to measure yaw even though object 32 yaw angle is not actively changed by the user and under the lateral symmetric conditions just described, such as during wind tunnel testing in which the object is rolled.

Gyros must be "zeroed" or "tared" so voltage output does not include the inherent voltage, or voltage bias, $v_0$ (with respect to pitch), $e_0$ (with respect to roll). Voltage bias $v_0$, $e_0$ is the voltage output of the sensor 24, 26 when the sensor is at the initial attitude. In one embodiment the voltage bias $v_0$, $e_0$ is measured before fluid, such as air in a wind tunnel 34, is being passed over the object 32 and before the object is moved. It is necessary to identify the voltage bias $v_0$, $e_0$ so it can be subtracted from the subsequent voltage outputs "v", "e", respectively, to render the actual voltage (i.e., v-$v_0$ with respect to pitch, e-$e_0$ with respect to roll) difference between the initial and subsequent attitudes. The initial orientation ρ (with respect to pitch), β (with respect to roll) is the orientation measured by the first tilt sensor 22 when the object is at the initial attitude. Because gyros measure a rate of attitude change, the initial orientation ρ, β of the object 32 when the object is at its initial attitude and the orientation sensors 24, 26 are outputting the voltage bias $v_0$, $e_0$ must be measured by another sensor (e.g., the first tilt sensor 22). For example, when an object 32 is at an initial attitude, such as having a 1° pitch orientation, the gyro mounted on the object will have a particular initial output (i.e., voltage bias), but the actual initial orientation (1°) cannot be determined using the gyro alone. Further, in this example if the object 32 were moved from the initial pitch orientation of 1° to a subsequent pitch orientation of 5°, with or without more than nominal object vibration, the gyro would accurately report that the gyro has moved 4°. However, the end orientation (i.e., 5°) cannot be determined without knowing the start position of the gyro. Thus, a gyro 24, 26 can be used to determine subsequent orientation when the initial position is known or determined. As will be appreciated by those skilled in the art, the conversion constants κ, X can be determined through experimentation so $$\kappa \int_0^t (e - e_0) dt + \rho \text{ and } \chi \int_0^t (e - e_0) dt + \beta$$

equal the proper resulting angle α, θ, respectively, of the sensor.

A second tilt sensor 28 may be used to check the accuracy of the first tilt sensor 22, the first orientation sensor 24, and/or the second orientation sensor 26. For example, the second tilt sensor 28 can supplementarily measure (i.e., measure in addition to the measurement of the first tilt sensor 22) an initial orientation (i.e., initial pitch angle ρ and/or initial roll angle β) of the object 32 and the processor can compare that measurement to the initial orientation measured by the first tilt sensor 22. The second tilt sensor 28 can also supplementarily measure (i.e., measure in addition to the measurement of the first and/or second orientation sensors 24, 26) a subsequent orientation (e.g., subsequent pitch angle α and/or subsequent roll angle θ) of the object 32 and the processor can compare that measurement to the subsequent orientation measured by the first orientation sensor 24 and, if present, the second orientation sensor 26. In one embodiment, the system 20 does not include an accuracy checking second tilt sensor 28. In an embodiment having a checking sensor 28, the checking sensor is used to determine one or both conversion constants ρ, β. The first tilt sensor 22 may also be used to determine one or both conversion constants ρ, β. In one embodiment the checking sensor 28 is a servo-accelerometer. Although other types of servo-accelerometers 28 may be used without departing from the scope of the present invention, in one embodiment the servo-accelerometer is a QA 2000 sensor, available from Honeywell International Inc., of Morristown, N.J.

Figure 3:
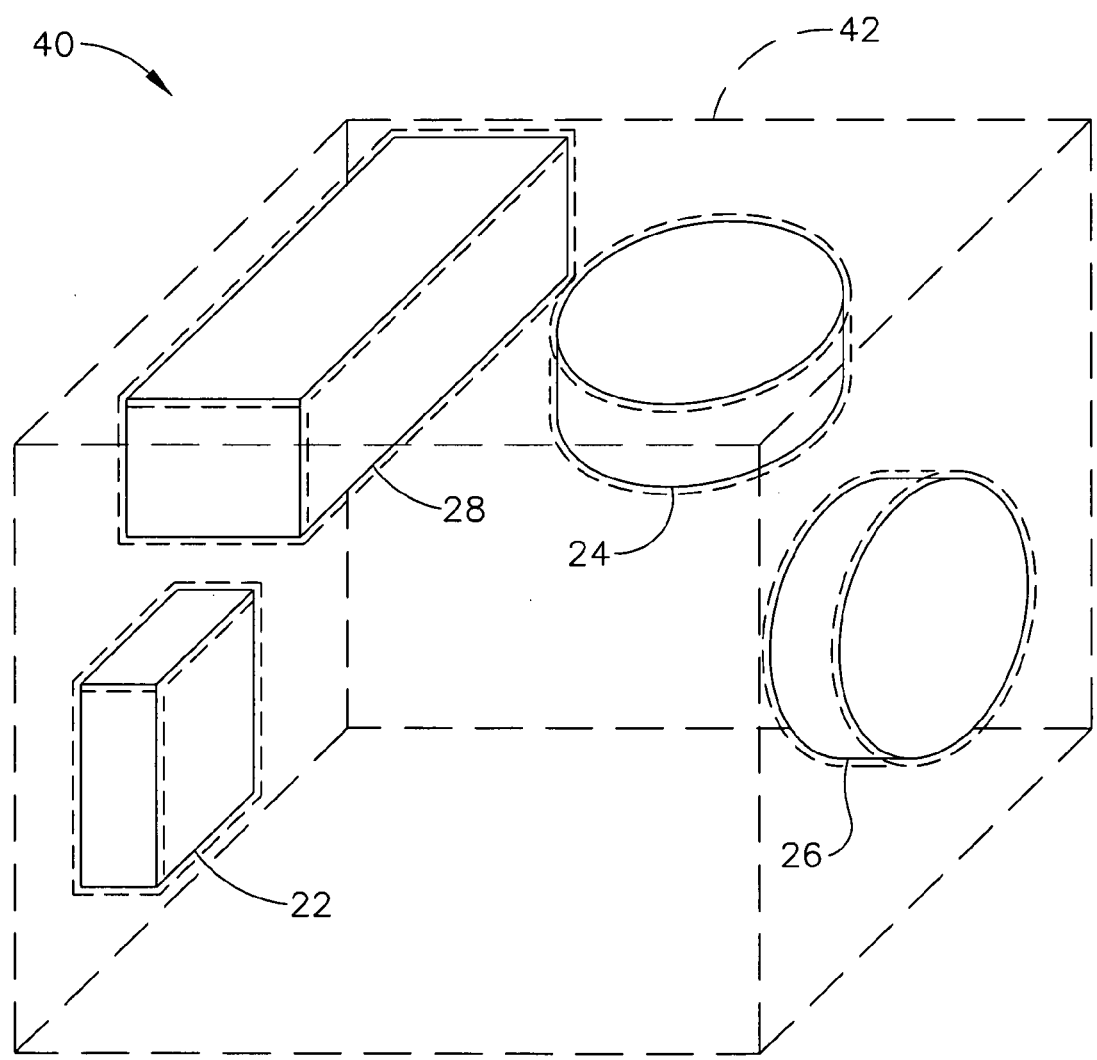
FIG. 3 is a perspective assembly according to a second embodiment of the present invention.

Some or all system 20 sensors 22, 24, 26, 28, 30 may be mounted in a single assembly that is in turn mounted on the object 32. As an example, FIG. 3 shows a assembly 40 according to a second embodiment of the present invention wherein the first tilt sensor 22, the first orientation sensor 24, the second orientation sensor 26, and the second tilt 28 are mounted on a common mounting structure 42, such as a block. The mounting structure 42 is sized and shaped to accommodate some or all of the sensors 22, 24, 26, 28, 30 and for mounting on the object 32. For example, the mounting structure 42 can be sized and shaped to fit into a receiving cavity (not shown) of the object 32 so that no part of the mounting structure protrudes beyond any outer surface of the object. Although the mounting structure 42 may be made of other materials without departing from the scope of the present invention, in one embodiment the structure is made of aluminum.

Figure 4:
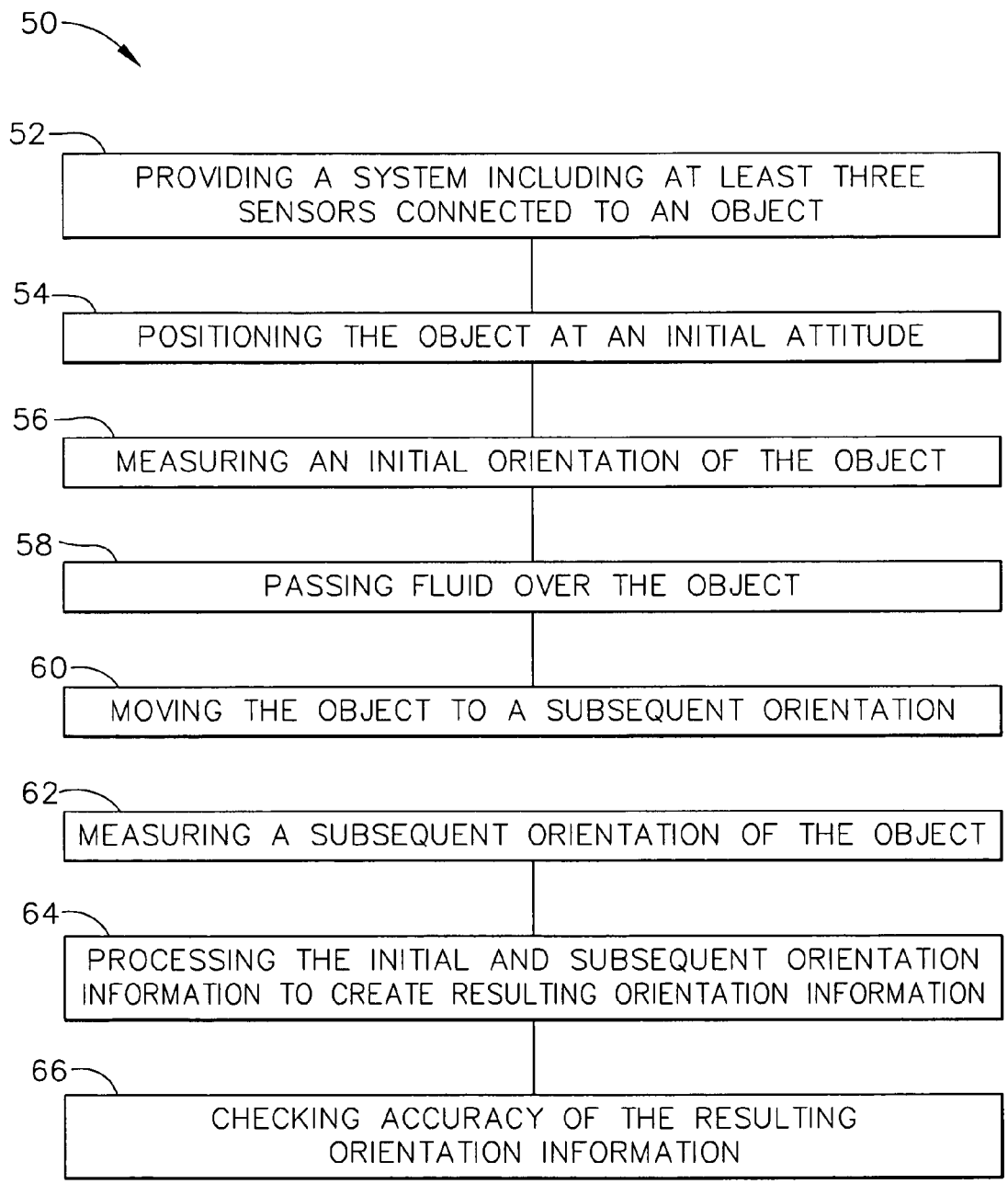
FIG. 4 is a flow diagram showing a process for determining resulting object orientation according to a third embodiment of the present invention.
Figure 5:
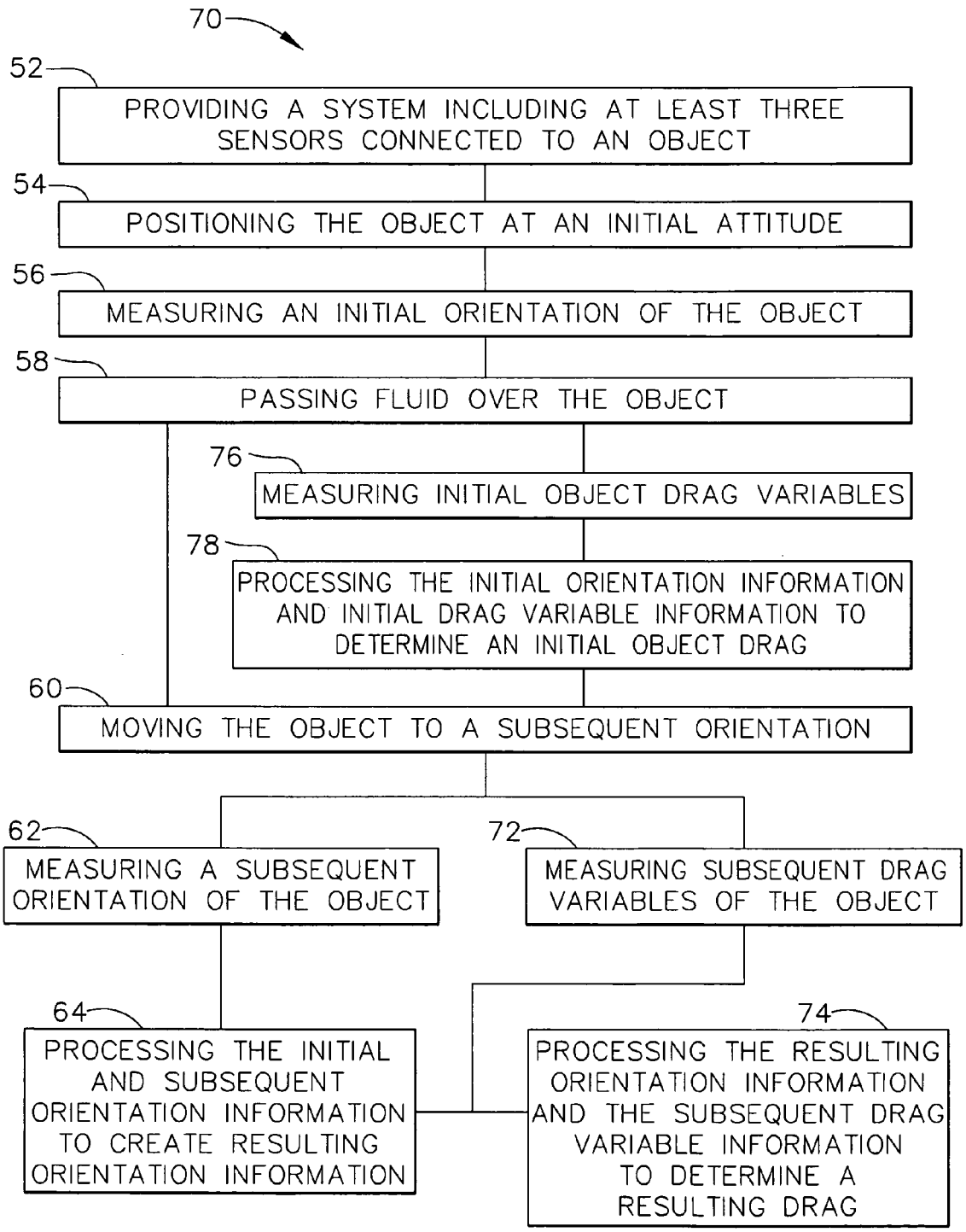
FIG. 5 is a flow diagram showing a process for determining resulting object drag according to a fourth embodiment of the present invention.

As shown in FIG. 4, the system 20 can be used in a process 50 for determining resulting orientation of an object 32 moved from an initial attitude to a subsequent attitude. As shown in FIG. 5, the system can further be used in a process 70 for determining drag characteristics of the object 32 by determining and considering the resulting object 32 orientation. The process 50 of determining object 32 orientation begins with a first step 52 of providing the system including the plurality of sensors 22, 24, 26, 28 mounted on the object and the processor 34 operatively connected to each sensor.

The process 50 of determining resulting orientation of the object 32 further includes a step 54 of positioning the object at an initial attitude and a step 56 of measuring an initial orientation (i.e., initial pitch angle ρ and/or initial roll angle β) of the object while the object is at the initial attitude to create initial orientation information. As described above, a single sensor, such as a first tilt sensor 22, or multiple sensors can be used to measure object 32 orientation. Object 32 orientation may be measured with respect to any number of axes of rotation (e.g., pitch, roll, and yaw). The process 50 of determining resulting object 32 orientation also includes a step 58 of passing fluid (not shown), such as air or water, over the object. This passing of fluid can be accomplished by moving the object 32 though the fluid, such as by flying an aircraft through the air, or by forcing fluid over the object to simulate the object being moved through the fluid, such as by conducting wind tunnel testing of a model aircraft. The step 56 of measuring initial orientation of the object 32 may be performed before or after the step 58 of passing fluid over the object. In one embodiment, fluid is continually passed over the object 32 from a beginning of a test to an end of the test.

The process 50 of determining resulting orientation of the object 32 also includes a step 60 of moving the object, while the fluid is still flowing over the object, from its initial attitude to a subsequent attitude. The process 50 further includes a step 62 of measuring a subsequent orientation (i.e., corresponding to the first orientation sensor 24 and/or the second orientation sensor outputs "v" and "e") of the object to create subsequent orientation information after the object 32 is moved from its initial attitude to a subsequent attitude and while the fluid is still flowing over the object. The step 62 of measuring the subsequent orientation may be performed using the first orientation sensor 24 and/or the second orientation sensor 26. In one embodiment, the object 32 is moved continually from the initial attitude to the subsequent attitude and repeated orientation measurements 62 are made during the continuous movement. Although the object 32 may be moved at other rates during the moving step 60 without departing from the scope of the present invention, in one embodiment the object is moved at a rate of between about 3° per second and about 60° per second.

After the step 62 of measuring subsequent object orientation, the process 50 of determining resulting object 32 orientation includes a step 64 of processing the initial orientation information and the subsequent orientation information to determine the resulting orientation according to equation (3), equation (4), or, as will be apparent to one of skill in the art, a combination of equations (3) and (4). The processing step 64 may be performed using the processor 36. The process 50 of determining resulting object 32 orientation may also include a step 66 of checking accuracy of the resulting orientation information created in the processing step 64. For example, the checking step 66 may include checking the accuracy of the readouts of the first tilt sensor 22, the first orientation sensor 24, and/or the second orientation sensor 26 by supplementarily measuring (i.e., measure in addition to the measurement of the first tilt sensor 22) an initial and/or subsequent object orientations using the second tilt sensor 28. Although a typical tilt sensor 28, such as an electrolytic tilt sensor or servo-accelerometer, cannot be used to accurately measure object 32 orientation under dynamic conditions (i.e., object orientation changing rapidly and/or the object vibrating) as described, they can be used to measure initial and subsequent object orientations when the object is still.

As shown in FIG. 5, the process 70 for determining drag characteristics of an object 32 being moved between various attitudes may include steps 52, 54, 56, 58, 60, 62, and 64 from the process 50 of determining a resulting object orientation. Drag D can be determined by an equation (5):

$$D = F_{AS} \cos \alpha_s + F_{NS} \sin \alpha_s \quad (5)$$

where:

$F_{AS}$=subsequent aft force;

$F_{NS}$=subsequent normal force; and $\alpha_s$ is the subsequent pitch angle or angle of attack of the object 32.

The subsequent aft force $F_{AS}$ and subsequent normal force $F_{NS}$ are referred to as drag variables because they are the force values used to determine drag. As will be apparent to a skilled artisan, equation (5) can be adjusted to consider changes in roll angle θ instead of pitch angle α or along with changes in pitch angle. Equation (5) can also be adjusted to consider changes in yaw angle instead of or along with changes in pitch and/or roll angles. The process 70 of determining drag characteristics of the object 32 includes a step 72 of measuring the subsequent drag variables $F_{NS}$, $F_{NS}$ after the object has moved to the subsequent attitude and while the fluid continues to pass over the object to create subsequent drag variable information. In one embodiment, the step 72 of measuring the subsequent drag variables $F_{AS}$, $F_{NS}$ is performed using the drag or internal balance sensor 30. In one embodiment, the balance 30 is a six-component strain-gage balance and is connected to the object 32 and a rigid stand or "sting" (not shown) that extends rearward from the object in a conventional manner. Although other types of balances 30 may be used without departing from the scope of the present invention, in one embodiment the balance is a 1.5 inch MK XXI balance, available from the Mechanical Systems division (previously the Able Corporation, of Yorba Linda, Calif.) of Smiths Aerospace, located in Yorba Linda, Calif. In one embodiment (not shown), the balance 30 is mounted on the mounting structure 42 of the common sensor assembly, such as that shown on FIG. 3. The subsequent orientation angles α, θ are determined using steps 52-64 as described above.

In one embodiment, the object 32 is moved continuously from its initial attitude to multiple subsequent attitudes and repeated subsequent drag measurements are made during the continuous movement. The process 70 of determining object 32 drag characteristics further includes a step 74 of processing the resulting orientation information from the step 64 of processing initial and subsequent orientation information and the subsequent drag variable information to determine the resulting drag. In one embodiment, the step 74 of processing information to determine the resulting object 32 drag is performed using the processor 36. When multiple subsequent drag measurements are made, the processor 36 may perform multiple corresponding processing steps to determine resulting drag characteristics of the object 32.

The process 70 of determining drag characteristics of the object 32 may further include a step 76 of measuring initial drag variables $F_A$, $F_N$ before the object is moved in the moving step 60 and before or after the step 58 of passing fluid over the object. The step 76 of measuring initial drag variables $F_A$, $F_N$ may be performed using the drag sensor 30. In addition, the process 70 of determining object 32 drag characteristics may include a step 78 of processing the initial orientation information created in the step 56 of measuring initial object orientation and the initial drag variable information to determine an initial object drag.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method for designing an aircraft comprising:

providing a model of the aircraft and a plurality of sensors mounted on the aircraft model;

positioning the aircraft model in a fluid tunnel at an initial attitude;

measuring an initial orientation of the aircraft model while the aircraft model is at the initial attitude using a first tilt sensor of said sensors to create initial orientation information;

passing fluid over the aircraft model using the fluid tunnel;

actively moving the aircraft model from the initial attitude to a subsequent attitude; and measuring a subsequent orientation of the aircraft model while the aircraft model is at the subsequent attitude using a first orientation sensor of said sensors to create subsequent orientation information.

2. A method for designing an aircraft as set forth in claim 1 further comprising:

measuring subsequent drag variables of the aircraft model while the aircraft model is at the subsequent attitude and said fluid is passing over the aircraft model using a drag sensor of said sensors to create subsequent drag information.

3. A method for designing an aircraft as set forth in claim 2 further comprising:

processing said initial and subsequent orientation information using the processor to create resulting orientation information of the aircraft model; and processing said resulting orientation information and said subsequent drag information using the processor to determine a resulting drag of the aircraft model corresponding to drag characteristics of said aircraft.

4. A process for determining drag characteristics of an object in a fluid tunnel comprising:

providing a system including at least three sensors mounted on said object and a processor operatively connected to each sensor;

positioning the object at an initial attitude in the fluid tunnel;

measuring an initial orientation of the object while the object is at the initial attitude using a first tilt sensor of said sensors to create initial orientation information;

passing fluid over the object using the fluid tunnel;

moving the object from said initial attitude to a subsequent attitude;

measuring a subsequent orientation of the object while the object is at said subsequent attitude using a first orientation sensor of said sensors to create subsequent orientation information of the object;

measuring subsequent drag variables of the object while the object is at the subsequent attitude and said fluid is passing over the object using a drag sensor of said sensors to create subsequent drag information;

processing said initial and subsequent orientation information using the processor to create resulting orientation information of the object; and processing said resulting orientation information and said subsequent drag information using the processor to determine a resulting drag of the object.

5. A process as set forth in claim 4 further comprising:
measuring initial drag variables of the object while the object is at the initial attitude and said fluid is passing over the object using said drag sensor to create initial drag variable information of the object; and
processing said initial orientation information and said initial drag variable information using said processor to determine an initial object drag.

6. A process as set forth in claim 4 wherein said fluid tunnel is a wind tunnel and the passing step includes passing air over the object.

7. A process as set forth in claim 4 further comprising checking accuracy of the first tilt sensor and first orientation sensor measurements by supplementarily measuring initial and subsequent orientation of the object using a second tilt sensor of said sensors.

8. A process as set forth in claim 4 wherein:
the object is moved continuously from said initial attitude to a plurality of subsequent attitudes,
the step of passing fluid over the object is continuously performed during the continuous movement;
the step of measuring subsequent orientation is repeatedly performed during the continuous movement;
the step of measuring subsequent drag is repeatedly performed during the continuous movement; and
the processing steps are repeatedly performed during the continuous movement.

9. A process as set forth in claim 4 wherein:
said first tilt sensor and said first orientation sensor are configured to measure object orientation with respect to at least two axes of rotation each;
the step of measuring the initial orientation of the object includes measuring an initial pitch of the object and an initial roll of the object; and
the step of measuring the subsequent orientation of the object includes measuring a subsequent pitch of the object and a subsequent roll of the object.

10. A process as set forth in claim 4 wherein:
the step of measuring the initial orientation of the object includes measuring an initial pitch of the object, an initial roll of the object, and an initial yaw of the object using said first tilt sensor and a second tilt sensor of said sensors, and
the step of measuring the subsequent orientation of the object includes measuring a subsequent pitch of the object, a subsequent roll of the object, and a subsequent yaw of the object using said first orientation sensor and a second orientation sensor of said sensors.

11. A process for determining a resulting orientation of an object comprising:
providing a system including a plurality of sensors mounted on said object and a processor operatively connected to each sensor;
positioning the object at an initial attitude;
measuring an initial orientation of the object while the object is at the initial attitude using a first tilt sensor of said sensors to create initial orientation information;
passing fluid over the object;
moving the object from the initial attitude to a subsequent attitude;
measuring a subsequent orientation of the object while the object is at the subsequent attitude using a first orientation sensor of said sensors to create subsequent orientation information; and
processing the initial orientation information and the subsequent orientation information using the processor to determine the resulting orientation of the object.

12. A process as set forth in claim 11 wherein:
the positioning step includes positioning the object in a wind tunnel; and
the passing step includes passing air over the object.

13. A process as set forth in claim 11 further comprising checking accuracy of the first tilt sensor and first orientation sensor measurements by supplementarily measuring initial and subsequent orientation of the object using a second tilt sensor of said sensors.

14. A process as set forth in claim 11 wherein:
said first tilt sensor and said first orientation sensor are configured to measure object orientation with respect to at least two axes of rotation each;
the step of measuring the initial orientation of the object includes measuring an initial pitch of the object and an initial roll of the object; and
the step of measuring the subsequent orientation of the object includes measuring a subsequent pitch of the object and a subsequent roll of the object.

15. A process as set forth in claim 14 wherein:
the step of measuring the initial orientation of the object includes measuring an initial pitch of the object, an initial roll of the object, and an initial yaw of the object using said first tilt sensor and a second tilt sensor of said sensors, and
the step of measuring the subsequent orientation of the object includes measuring a subsequent pitch of the object, a subsequent roll of the object, and a subsequent yaw of the object using said first orientation sensor and a second orientation sensor of said sensors.

16. A system for determining a resulting orientation of an object comprising:
a first tilt sensor configured for mounting on the object and measuring an initial orientation of the object to create initial object orientation information during operation of the system;
a first orientation sensor configured for mounting on the object and measuring a subsequent orientation of the object to create subsequent orientation information during operation of the system; and
a processor operatively connected to said first tilt sensor and said first orientation sensor for determining a resulting orientation of the object by processing said initial orientation information and said subsequent orientation information during operation of the system wherein said first orientation sensor measures object pitch and object roll and said system further comprises a second orientation sensor that is operatively connected to said processor and configured for mounting on the object for measuring object pitch and object yaw during operation of the system.

17. A system as set forth in claim 16 wherein said first tilt sensor is a two-axis tilt sensor and said first orientation sensor is a two-axis gyroscopic sensor.

18. A system as set forth in claim 16 wherein said sensors are assembled in a single structure that is configured for mounting on the object.

19. A system as set forth in claim 16 wherein said first tilt sensor is a two-axis tilt sensor and each of said first and second orientation sensors is a two-axis gyroscopic sensor.

20. A system as set forth in claim 16 wherein said sensors are assembled in a single structure that is configured for mounting on the object.

* * * * *